United States Patent
Piot et al.

(10) Patent No.: US 11,003,284 B2
(45) Date of Patent: May 11, 2021

(54) TOUCH SENSITIVE DEVICE WITH A CAMERA

(71) Applicant: Beechrock Limited, Castletown (IM)

(72) Inventors: Julien Piot, Rolle (CH); Owen Drumm, Dublin (IE)

(73) Assignee: Beechrock Limited, Castletown (IM)

( * ) Notice: Subject to any disclaimer, the term of this patent is extended or adjusted under 35 U.S.C. 154(b) by 0 days.

(21) Appl. No.: 16/439,536

(22) Filed: Jun. 12, 2019

(65) Prior Publication Data

US 2019/0377435 A1    Dec. 12, 2019

Related U.S. Application Data

(60) Provisional application No. 62/683,800, filed on Jun. 12, 2018.

(51) Int. Cl.
*G06F 3/041* (2006.01)
*G06F 3/042* (2006.01)
*G06F 3/0354* (2013.01)

(52) U.S. Cl.
CPC .......... *G06F 3/042* (2013.01); *G06F 3/03545* (2013.01); *G06F 3/0416* (2013.01)

(58) Field of Classification Search
CPC .. G06F 3/0308; G06F 3/0346; G06F 3/03545; G06F 3/0383; G06F 3/0416; G06F 3/042; G06F 3/0421
See application file for complete search history.

(56) References Cited

U.S. PATENT DOCUMENTS

| | | | |
|---|---|---|---|
| 6,498,602 B1 | 12/2002 | Ogawa | |
| 2002/0145595 A1* | 10/2002 | Satoh | G06F 3/0423 345/173 |
| 2012/0224054 A1* | 9/2012 | Ogawa | G06F 3/0428 348/135 |

* cited by examiner

*Primary Examiner* — Insa Sadio
(74) *Attorney, Agent, or Firm* — Fenwick & West LLP

(57) ABSTRACT

A touch sensitive device includes a touch surface and emitters and detectors. The emitters produce optical beams that propagate across the touch surface and are received by the detectors. Touch events from a touch object disturb the beams propagating toward the detectors. Beam values are recorded by the detectors and used to determine the touch events. The touch sensitive device also includes a camera that captures images of touch objects. The images and variations in the beams are analyzed to continuously track the touch object before, during, and after touch events.

20 Claims, 13 Drawing Sheets

TOUCH SENSITIVE DEVICE WITH A CAMERA

CROSS REFERENCE TO RELATED APPLICATIONS

This application claims the benefit of priority to U.S. Provisional Patent Application No. 62/683,800, "Sensor Fusion with Camera Tracked Active Pens," filed on Jun. 12, 2018, which is incorporated by reference.

BACKGROUND

1. Field of Art

This description generally relates to a stylus interacting with a surface of touch-sensitive device, and specifically to a stylus configured to disturb optical beams in different manners based on a state of the stylus.

2. Description of the Related Art

Touch-sensitive displays for interacting with computing devices are becoming more common. A number of different technologies exist for implementing touch-sensitive displays and other touch-sensitive devices. Examples of these techniques include, for example, resistive touch screens, surface acoustic wave touch screens, capacitive touch screens and certain types of optical touch screens.

During a touch event, touch sensitive systems can determine basic information about the touch object. However, the information determined from the touch event is subsequently lost or outdated after the touch object leaves the surface. For example, the location of the touch object can be determined during the touch event, but the location of the touch object becomes unknown after the touch event. Thus, touch objects can only be tracked when they in contact with the touch surface.

SUMMARY

An optical touch-sensitive device may determine the locations of touch events. The optical touch-sensitive device includes multiple emitters and detectors. Each emitter produces optical radiant energy which is received by the detectors. In some embodiments, the optical emitters are frequency or code-division multiplexed in a manner so that many optical sources can be received by a detector simultaneously. Alternatively, emitters are time multiplexed and are activated sequentially in a predefined sequence. Touch events disturb the optical energy transfer from emitter to detector. Variations in light transfer resulting from the touch events are captured, and are used to determine the touch events. In one aspect, information indicating which emitter-detector pairs have been disturbed by touch events is received. The light disturbance for each pair is characterized and used to determine the beams attenuation resulting from the touch events.

The emitters and detectors may be interleaved around the periphery of the touch sensitive surface. In other embodiments, the number of emitters and detectors are different and are distributed around the periphery in a defined order. The emitters and detectors may be regularly or irregularly spaced. In some cases, the emitters and detectors are located on less than all of the sides (e.g., one side). In some cases, the emitters and/or detectors are not physically located at the periphery. For example, couplers, such as waveguides, couple beams between the touch surface and the emitters and/or detectors. Reflectors may also be positioned around the periphery to reflect optical beams, causing the path from the emitter to the detector to pass across the surface more than once. For each emitter-detector pair, a beam is defined by combining light rays propagating from an emitter and a detector. In some implementations, the disturbance of a beam is characterized by its transmission coefficient, and the beam attenuation is determined from the transmission coefficient.

Embodiments relate to a system that includes a touch surface, emitters, detectors, a camera, and a controller. The emitters produce optical beams that propagate across the touch surface and are received by the detectors. Touches from a touch object in contact with the touch surface disturb the optical beams. The camera is positioned to capture images of the touch object in contact with the touch surface and/or above the touch surface. The controller receives beam data from the detectors for optical beams distributed by the touch object. The controller receives the captured images of the touch object from the camera. The controller determines information about the touch object based on the beam data and/or the captured images.

Examples of determining touch object information include recognizing the object, determining the spatial position of the object (e.g., position, orientation), tracking the spatial position of the object (e.g., in real-time), determining whether the object is in contact with the touch surface or above the touch surface, determining a touch location of the object (if it is in contact with the surface), determining a projected touch location (an estimated location of a future touch location as the object approaches the surface), determining an object type of the object (e.g., finger, active stylus, passive stylus, palm, forearm, etc.), determining an operational mode of the object, and/or determining the contact area of the object.

If the stylus is an active stylus that emits light, determining touch object information can also include detecting the emitted light, determining the wavelengths of the light, detecting the location of the point(s) of emission of the light on the stylus, detecting the orientation of the stylus based on the light, determining a pulse pattern of the light, determining the operational mode based on the light, distinguishing the stylus from other touch objects based on the light, determining the distribution of light, and/or determining the polarization of the light.

In some embodiments, the controller determines the spatial position of the touch object relative to the touch surface based on the beam data and/or the captured images. In some embodiments, the controller determines the touch object is in contact with the touch surface based on the beam data and the captured images. In some embodiments, the controller determines the touch object is in contact with the touch surface based on at least one of the beam data or the captured images, determines an approximate touch location of the touch object on the touch surface based on the captured images, and modifies the approximate touch location based on the beam data. In some embodiments, the controller determines the touch object is in contact with the touch surface based on the beam data and determines an orientation of the touch object based on the image data. In some embodiments, the controller determines the touch object is above the touch surface based on the beam data and the captured images. In some embodiments, the controller determines the touch object is above the touch surface based on the beam data and the captured images and determines the spatial position of the touch object above the touch surface based on the captured images. In some embodiments, the controller determines an orientation of the touch object based on the image data. In some embodiments, the controller determines a projected touch location on the touch surface before the touch object contacts the touch surface based on the image data and determines an actual touch location on the touch surface after the touch object contacts the touch surface based on the beam data. In some embodiments, to determine the actual touch location, the controller monitors beam data associated with beam paths in a region of the touch surface that includes the projected touch location. In some embodiments, controller is further configured to track the spatial position of the touch object as the touch object moves. In some embodiments, the spatial position of the touch object is tracked in real-time.

In some embodiments, the controller determines a touch object type of the touch object based on the beam data and/or the captured images.

In some embodiments, the controller determines an operational mode of the touch object based on the captured images and the beam data.

In some embodiments, the touch object is a stylus and the captured images include light emitted by the stylus. The controller determines the touch object is a stylus based on the light emitted by the stylus and determines a touch location of the stylus on the touch surface based on the beam data.

In some embodiments, the touch object is a stylus and the captured images include light emitted by the stylus. The controller tracks the spatial position of the stylus based on the light emitted by the stylus.

In some embodiments, the touch object is a stylus and the captured images include light emitted by the stylus. The controller determines a touch location of the stylus on the touch surface based on the beam data and determines an orientation of the stylus based on the light emitted by the stylus.

In some embodiments, wherein the touch object is a stylus and the captured images include light emitted by the stylus. The controller determines a touch location of the stylus on the touch surface based on the beam data and distinguishes the stylus from another touch object based on the light emitted by the stylus.

In some embodiments, the controller receives, via a communications channel between the system and the touch object, at least one of: accelerometer sensor data, gyroscope sensor data, or force sensor data.

In some embodiments, the camera is positioned on the periphery of the touch surface.

In some embodiments, the camera is positioned below the touch surface.

In some embodiments, the camera is a time of flight (TOF) camera.

BRIEF DESCRIPTION OF DRAWINGS

Embodiments of the present disclosure will now be described, by way of example, with reference to the accompanying drawings.

DETAILED DESCRIPTION

I. Introduction

A. Device Overview

Figure 1:
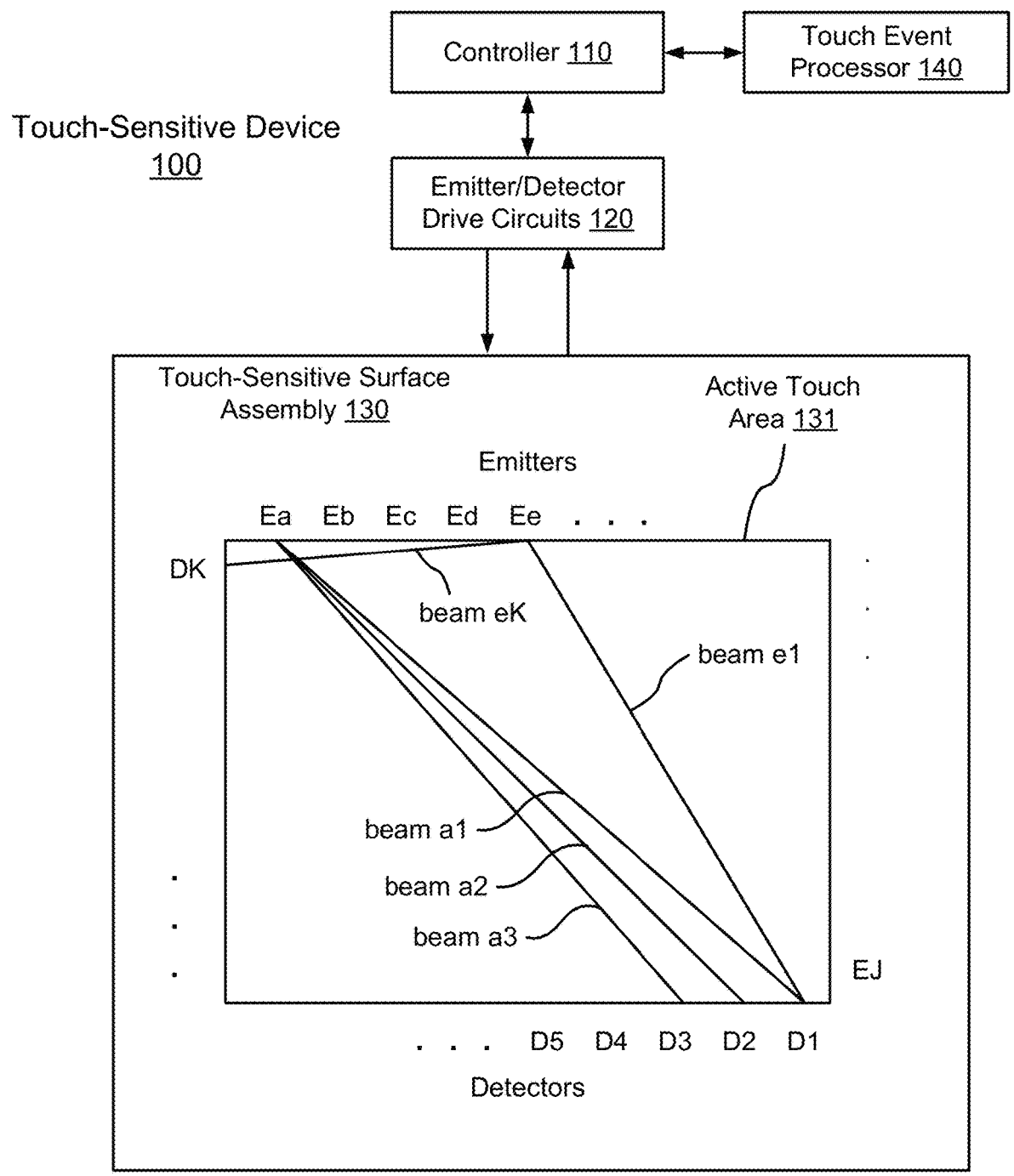
FIG. 1 is a diagram of an optical touch-sensitive device, according to an embodiment.

FIG. 1 is a diagram of an optical touch-sensitive device 100, according to one embodiment. The optical touch-sensitive device 100 includes a controller 110, emitter/detector drive circuits 120, and a touch-sensitive surface assembly 130. The surface assembly 130 includes a surface 131 over which touch events are to be detected. For convenience, the area defined by surface 131 may sometimes be referred to as the active touch area, touch surface, or active touch surface, even though the surface itself may be an entirely passive structure. The assembly 130 also includes emitters and detectors arranged along the periphery of the active touch surface 131 (although the emitters and detectors may only be arranged along a portion of the periphery or not along the periphery at all). In this example, there are J emitters labeled as Ea-EJ and K detectors labeled as D1-DK. The device also includes a touch event processor 140, which may be implemented as part of the controller 110 or separately as shown in FIG. 1. A standardized API may be used to communicate with the touch event processor 140, for example between the touch event processor 140 and controller 110, or between the touch event processor 140 and other devices connected to the touch event processor.

The emitter/detector drive circuits 120 serve as an interface between the controller 110 and the emitters Ej and detectors Dk. The emitters produce optical "beams" which are received by the detectors. Preferably, the light produced by one emitter is received by more than one detector, and each detector receives light from more than one emitter. For convenience, "beam" will refer to the light from one emitter to one detector, even though it may be part of a large fan of light that goes to many detectors rather than a separate beam.

The beam from emitter Ej to detector Dk will be referred to as beam jk. FIG. 1 expressly labels beams a1, a2, a3, e1 and eK as examples. Touches within the active touch area 131 will disturb certain beams, thus changing what is received at the detectors Dk. Data about these changes is communicated to the touch event processor 140, which analyzes the data to determine the location(s) (and times) of touch events on surface 131.

One advantage of an optical approach as shown in FIG. 1 is that this approach scales well to larger screen sizes compared to conventional touch devices that cover an active touch area with sensors, such as resistive and capacitive sensors. Since the emitters and detectors are positioned around the periphery, increasing the screen size by a linear factor of N means that the periphery also scales by a factor of N compared to $N^2$ for conventional touch devices.

B. Process Overview

Figure 2:
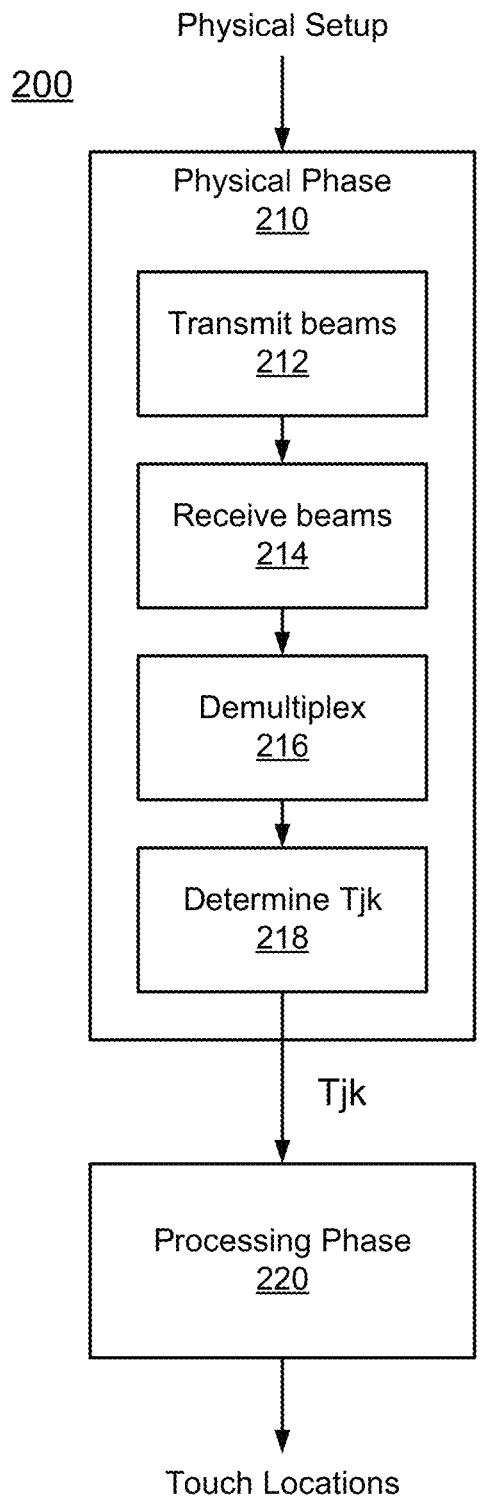
FIG. 2 is a flow diagram for determining the characteristics of touch events, according to an embodiment.

FIG. 2 is a flow diagram for determining the characteristics of touch events, according to an embodiment. This process will be illustrated using the device of FIG. 1. The process 200 is roughly divided into two phases, which will be referred to as a physical phase 210 and a processing phase 220. Conceptually, the dividing line between the two phases is a set of transmission coefficients Tjk.

The transmission coefficient Tjk is the transmittance of the optical beam from emitter j to detector k, compared to what would have been transmitted if there was no touch event interacting with the optical beam. In the following examples, we will use a scale of 0 (fully blocked beam) to 1 (fully transmitted beam). Thus, a beam jk that is undisturbed by a touch event has Tjk=1. A beam jk that is fully blocked by a touch event has a Tjk=0. A beam jk that is partially blocked or attenuated by a touch event has 0<Tjk<1. It is possible for Tjk>1, for example depending on the nature of the touch interaction or in cases where light is deflected or scattered to detectors k that it normally would not reach.

The use of this specific measure is purely an example. Other measures can be used. In particular, since we are most interested in interrupted beams, an inverse measure such as (1−Tjk) may be used since it is normally 0. Other examples include measures of absorption, attenuation, reflection, or scattering. In addition, although FIG. 2 is explained using Tjk as the dividing line between the physical phase 210 and the processing phase 220, it is not required that Tjk be expressly calculated. Nor is a clear division between the physical phase 210 and processing phase 220 required.

Returning to FIG. 2, the physical phase 210 is the process of determining the Tjk from the physical setup. The processing phase 220 determines the touch events from the Tjk. The model shown in FIG. 2 is conceptually useful because it somewhat separates the physical setup and underlying physical mechanisms from the subsequent processing.

For example, the physical phase 210 produces transmission coefficients Tjk. Many different physical designs for the touch-sensitive surface assembly 130 are possible, and different design tradeoffs will be considered depending on the end application. For example, the emitters and detectors may be narrower or wider, narrower angle or wider angle, various wavelengths, various powers, coherent or not, etc. As another example, different types of multiplexing may be used to allow beams from multiple emitters to be received by each detector. Several of these physical setups and manners of operation are described below, primarily in Section II.

The interior of block 210 shows one possible implementation of process 210. In this example, emitters transmit 212 beams to multiple detectors. Some of the beams travelling across the touch-sensitive surface are disturbed by touch events. The detectors receive 214 the beams from the emitters in a multiplexed optical form. The received beams are de-multiplexed 216 to distinguish individual beams jk from each other. Transmission coefficients Tjk for each individual beam jk are then determined 218.

The processing phase 220 computes the touch characteristics and can be implemented in many different ways. Candidate touch points, line imaging, location interpolation, touch event templates and multi-pass approaches are all examples of techniques that may be used to compute the touch characteristics (such as touch location) as part of the processing phase 220. Several of these are described below, primarily in Section III.

II. Physical Set-Up

The touch-sensitive device 100 may be implemented in a number of different ways. The following are some examples of design variations.

A. Electronics

With respect to electronic aspects, note that FIG. 1 is exemplary and functional in nature. Functions from different boxes in FIG. 1 can be implemented together in the same component.

For example, the controller 110 and touch event processor 140 may be implemented as hardware, software or a combination of the two. They may also be implemented together (e.g., as an SoC with code running on a processor in the SoC) or separately (e.g., the controller as part of an ASIC, and the touch event processor as software running on a separate processor chip that communicates with the ASIC). Example implementations include dedicated hardware (e.g., ASIC or programmed field programmable gate array (FPGA)), and microprocessor or microcontroller (either embedded or standalone) running software code (including firmware). Software implementations can be modified after manufacturing by updating the software.

The emitter/detector drive circuits 120 serve as an interface between the controller 110 and the emitters and detectors. In one implementation, the interface to the controller 110 is at least partly digital in nature. With respect to emitters, the controller 110 may send commands controlling the operation of the emitters. These commands may be instructions, for example a sequence of bits which mean to take certain actions: start/stop transmission of beams, change to a certain pattern or sequence of beams, adjust power, power up/power down circuits. They may also be simpler signals, for example a "beam enable signal," where the emitters transmit beams when the beam enable signal is high and do not transmit when the beam enable signal is low.

The circuits 120 convert the received instructions into physical signals that drive the emitters. For example, circuit 120 might include some digital logic coupled to digital to analog converters, in order to convert received digital instructions into drive currents for the emitters. The circuit 120 might also include other circuitry used to operate the emitters: modulators to impress electrical modulations onto the optical beams (or onto the electrical signals driving the emitters), control loops and analog feedback from the emitters, for example. The emitters may also send information to the controller, for example providing signals that report on their current status.

With respect to the detectors, the controller 110 may also send commands controlling the operation of the detectors, and the detectors may return signals to the controller. The detectors also transmit information about the beams received by the detectors. For example, the circuits 120 may receive raw or amplified analog signals from the detectors. The circuits then may condition these signals (e.g., noise suppression), convert them from analog to digital form, and perhaps also apply some digital processing (e.g., demodulation).

B. Touch Interactions

Not all touch objects are equally good beam attenuators, as indicated by their transmission coefficient Tjk. Beam attenuation mainly depends on the optical transparency of the object and the volume of the object portion that is interacting with the beam, i.e. the object portion that intersects the beam propagation volume.

Figure 3A:
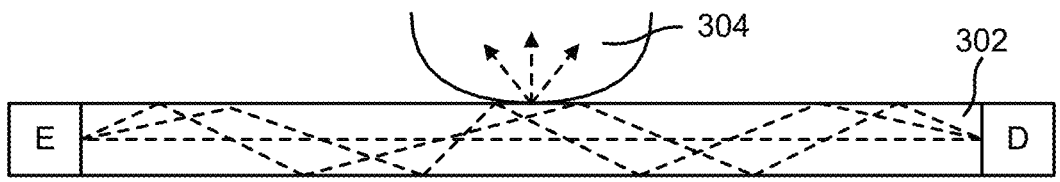
FIG. 3A-3F illustrate example mechanisms for a touch interaction with an optical beam, according to some embodiments.

FIGS. 3A-3F illustrate different mechanisms for a touch interaction with an optical beam. FIG. 3A illustrates a mechanism based on frustrated total internal reflection (TIR). The optical beam, shown as a dashed line, travels from emitter E to detector D through an optically transparent planar waveguide 302. The beam is confined to the waveguide 302 by total internal reflection. The waveguide may be constructed of plastic or glass, for example. An object 304, such as a finger or stylus, coming into contact with the transparent waveguide 302, has a higher refractive index than the air normally surrounding the waveguide. Over the area of contact, the increase in the refractive index due to the object disturbs the total internal reflection of the beam within the waveguide. The disruption of total internal reflection increases the light leakage from the waveguide, attenuating any beams passing through the contact area. Correspondingly, removal of the object 304 will stop the attenuation of the beams passing through. Attenuation of the beams passing through the touch point will result in less power at the detectors, from which the reduced transmission coefficients Tjk can be calculated.

Figure 3B:

FIG. 3B illustrates a mechanism based on beam blockage (also referred to as an "over the surface" (OTS) configuration). Emitters produce beams which are in close proximity to a surface 306. An object 304 coming into contact with the surface 306 will partially or entirely block beams within the contact area. FIGS. 3A and 3B illustrate some physical mechanisms for touch interactions, but other mechanisms can also be used. For example, the touch interaction may be based on changes in polarization, scattering, or changes in propagation direction or propagation angle (either vertically or horizontally).

Figure 3C:
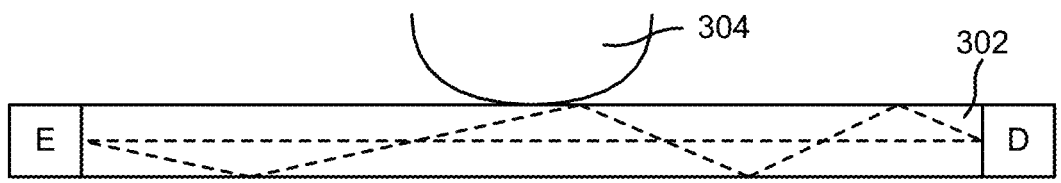

For example, FIG. 3C illustrates a different mechanism based on propagation angle. In this example, the optical beam is guided in a waveguide 302 via TIR. The optical beam hits the waveguide-air interface at a certain angle and is reflected back at the same angle. However, the touch 304 changes the angle at which the optical beam is propagating. In FIG. 3C, the optical beam travels at a steeper angle of propagation after the touch 304. The detector D has a response that varies as a function of the angle of propagation. The detector D could be more sensitive to the optical beam travelling at the original angle of propagation or it could be less sensitive. Regardless, an optical beam that is disturbed by a touch 304 will produce a different response at detector D.

Figure 3D:
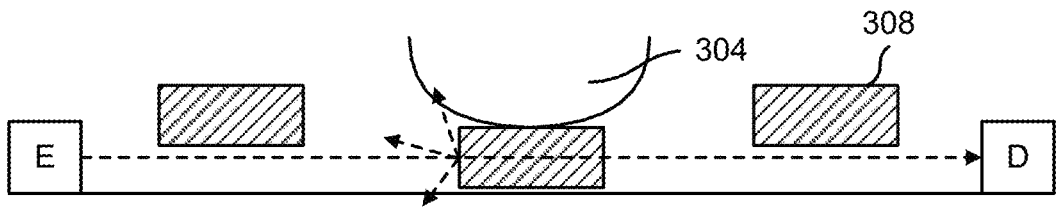

In FIGS. 3A-3C, the touching object was also the object that interacted with the beam. This will be referred to as a direct interaction. In an indirect interaction, the touching object interacts with an intermediate object, which interacts with the optical beam. FIG. 3D shows an example that uses intermediate blocking structures 308. Normally, these structures 308 do not block the beam. However, in FIG. 3D, object 304 contacts the blocking structure 308, which causes it to partially or entirely block the optical beam. In FIG. 3D, the structures 308 are shown as discrete objects, but they do not have to be so.

Figure 3E:
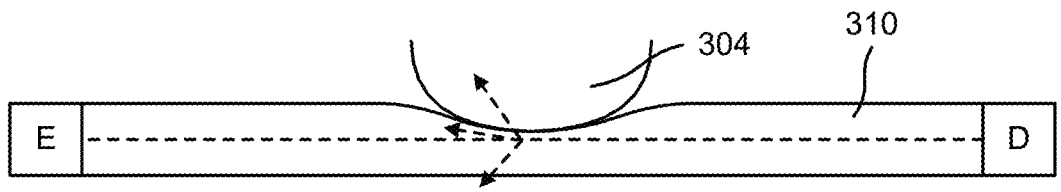

In FIG. 3E, the intermediate structure 310 is a compressible, partially transmitting sheet. When there is no touch, the sheet attenuates the beam by a certain amount. In FIG. 3E, the touch 304 compresses the sheet, thus changing the attenuation of the beam. For example, the upper part of the sheet may be more opaque than the lower part, so that compression decreases the transmittance. Alternatively, the sheet may have a certain density of scattering sites. Compression increases the density in the contact area, since the same number of scattering sites occupies a smaller volume, thus decreasing the transmittance. Analogous indirect approaches can also be used for frustrated TIR. Note that this approach could be used to measure contact pressure or touch velocity, based on the degree or rate of compression.

The touch mechanism may also enhance transmission, instead of or in addition to reducing transmission. For example, the touch interaction in FIG. 3E might increase the transmission instead of reducing it. The upper part of the sheet may be more transparent than the lower part, so that compression increases the transmittance.

Figure 3F:
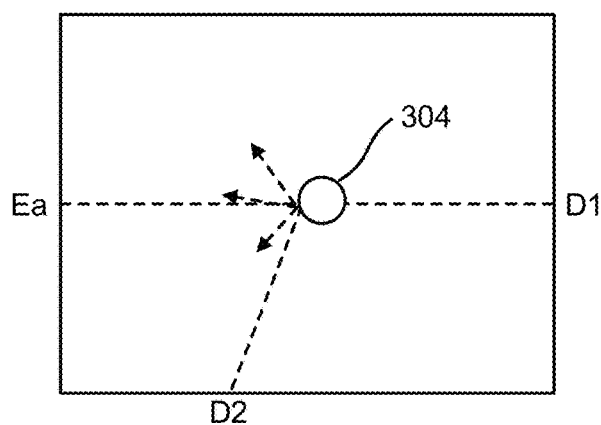

FIG. 3F shows another example where the transmittance between an emitter and detector increases due to a touch interaction. FIG. 3F is a top view. Emitter Ea normally produces a beam that is received by detector D1. When there is no touch interaction, Ta1=1 and Ta2=0. However, a touch interaction 304 blocks the beam from reaching detector D1 and scatters some of the blocked light to detector D2. Thus, detector D2 receives more light from emitter Ea than it normally would. Accordingly, when there is a touch event 304, Ta1 decreases and Ta2 increases.

For simplicity, in the remainder of this description, the touch mechanism will be assumed to be primarily of a blocking nature, meaning that a beam from an emitter to a detector will be partially or fully blocked by an intervening touch event. This is not required, but it is convenient to illustrate various concepts.

For convenience, the touch interaction mechanism may sometimes be classified as either binary or analog. A binary interaction is one that basically has two possible responses as a function of the touch. Examples includes non-blocking and fully blocking, or non-blocking and 10%+ attenuation, or not frustrated and frustrated TIR. An analog interaction is one that has a "grayscale" response to the touch: non-blocking passing through gradations of partially blocking to blocking. Whether the touch interaction mechanism is binary or analog depends in part on the nature of the interaction between the touch and the beam. It does not depend on the lateral width of the beam (which can also be manipulated to obtain a binary or analog attenuation, as described below), although it might depend on the vertical size of the beam.

Figure 4:
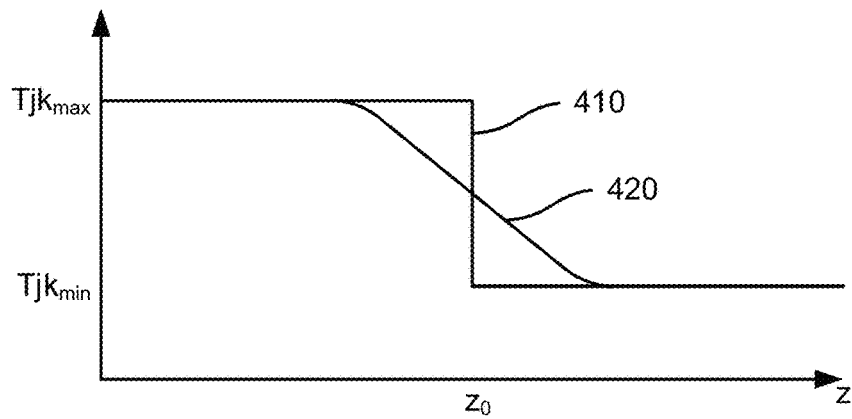
FIG. 4 is a graph of binary and analog touch interactions, according to an embodiment.

FIG. 4 is a graph illustrating a binary touch interaction mechanism compared to an analog touch interaction mechanism. FIG. 4 graphs the transmittance Tjk as a function of the depth z of the touch. The dimension z is into and out of the active touch surface. Curve 410 is a binary response. At low z (i.e., when the touch has not yet disturbed the beam), the transmittance Tjk is at its maximum. However, at some point z0, the touch breaks the beam and the transmittance Tjk falls fairly suddenly to its minimum value. Curve 420 shows an analog response where the transition from maximum Tjk to minimum Tjk occurs over a wider range of z. If curve 420 is well behaved, it is possible to estimate z from the measured value of Tjk.

C. Emitters, Detectors and Couplers

Each emitter transmits light to a number of detectors. Usually, each emitter outputs light to more than one detector simultaneously. Similarly, each detector may receive light from a number of different emitters. The optical beams may be visible, infrared (IR) and/or ultraviolet light. The term "light" is meant to include all of these wavelengths and terms such as "optical" are to be interpreted accordingly.

Examples of the optical sources for the emitters include light emitting diodes (LEDs) and semiconductor lasers. IR sources can also be used. Modulation of optical beams can be achieved by directly modulating the optical source or by using an external modulator, for example a liquid crystal modulator or a deflected mirror modulator. Examples of sensor elements for the detector include charge coupled devices, photodiodes, photoresistors, phototransistors, and nonlinear all-optical detectors. Typically, the detectors output an electrical signal that is a function of the intensity of the received optical beam.

The emitters and detectors may also include optics and/or electronics in addition to the main optical source and sensor element. For example, optics can be used to couple between the emitter/detector and the desired beam path. Optics can also reshape or otherwise condition the beam produced by the emitter or accepted by the detector. These optics may include lenses, Fresnel lenses, mirrors, filters, non-imaging optics and other optical components.

In this disclosure, the optical paths are shown unfolded for clarity. Thus, sources, optical beams and sensors are shown as lying in one plane. In actual implementations, the sources and sensors typically do not lie in the same plane as the optical beams. Various coupling approaches can be used. For example, a planar waveguide or optical fiber may be used to couple light to/from the actual beam path. Free space coupling (e.g., lenses and mirrors) may also be used. A combination may also be used, for example waveguided along one dimension and free space along the other dimension. Various coupler designs are described in U.S. Pat. No. 9,170,683, entitled "Optical Coupler," which is incorporated by reference herein.

D. Optical Beam Paths

Figure 5A:
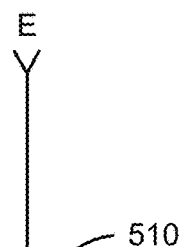
FIGS. 5A-5C are top views of differently shaped beam footprints, according to some embodiments.
Figure 5B:
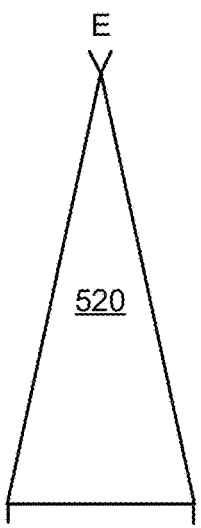
Figure 5C:
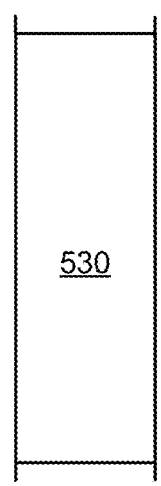

Another aspect of a touch-sensitive system is the shape and location of the optical beams and beam paths. In FIG. 1, the optical beams are shown as lines. These lines should be interpreted as representative of the beams, but the beams themselves are not necessarily narrow pencil beams. FIGS. 5A-5C illustrate different beam shapes when projected onto the active touch surface (beam footprint).

FIG. 5A shows a point emitter E, point detector D and a narrow "pencil" beam 510 from the emitter to the detector. In FIG. 5B, a point emitter E produces a fan-shaped beam 520 received by the wide detector D. In FIG. 5C, a wide emitter E produces a "rectangular" beam 530 received by the wide detector D. These are top views of the beams and the shapes shown are the footprints of the beam paths. Thus, beam 510 has a line-like footprint, beam 520 has a triangular footprint which is narrow at the emitter and wide at the detector, and beam 530 has a fairly constant width rectangular footprint. In FIG. 5, the detectors and emitters are represented by their widths, as seen by the beam path. The actual optical sources and sensors may not be so wide. Rather, optics (e.g., cylindrical lenses or mirrors) can be used to effectively widen or narrow the lateral extent of the actual sources and sensors.

Figure 6A:
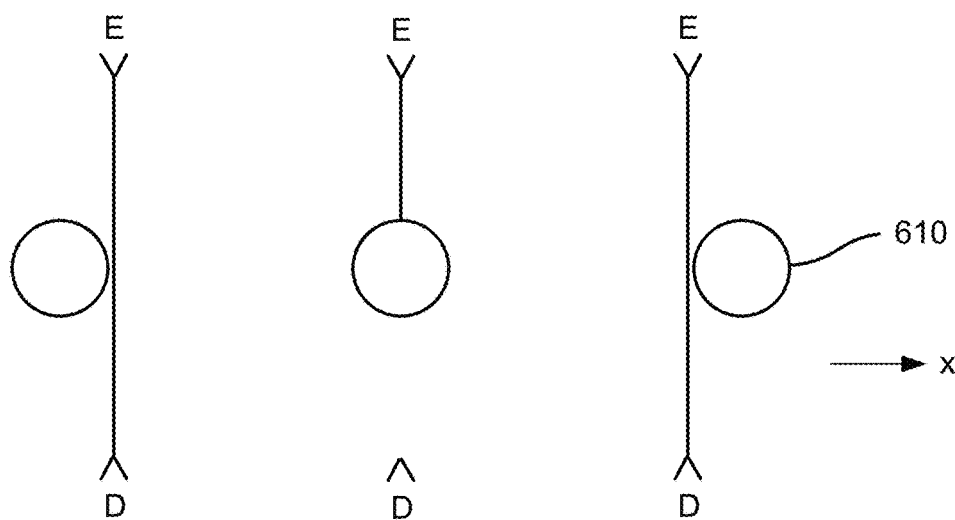
FIGS. 6A-6B are top views illustrating a touch point travelling through a narrow beam and a wide beam, respectively, according to some embodiments.
Figure 6B:
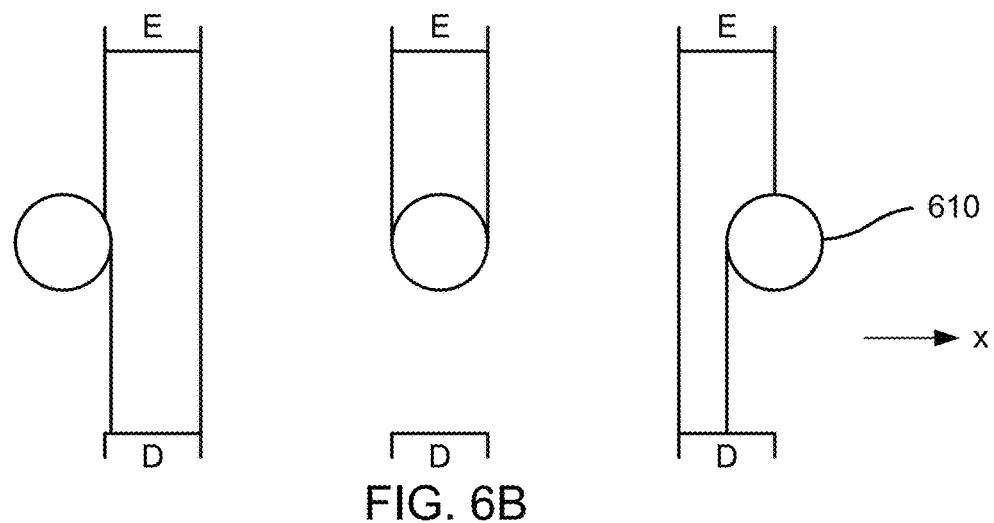
Figure 7:
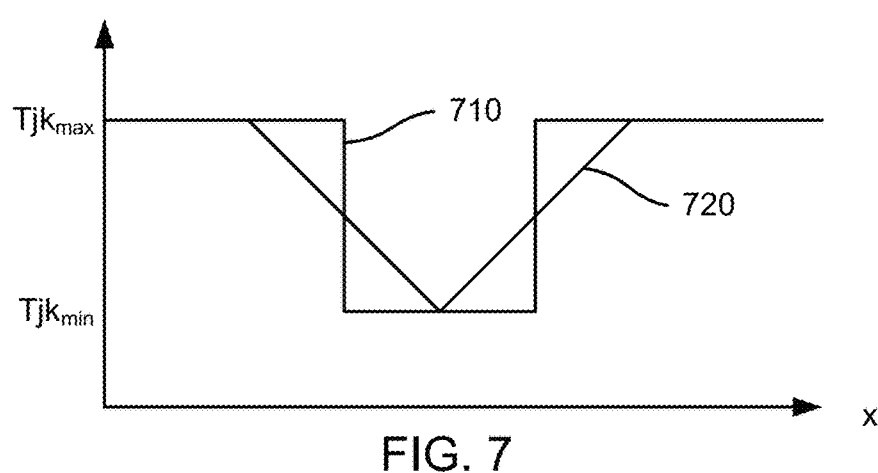
FIG. 7 is a graph of the binary and analog responses for the narrow and wide beams of FIG. 6, according to some embodiments.

FIGS. 6A-6B and 7 show, for a constant z position and various x positions, how the width of the footprint can determine whether the transmission coefficient Tjk behaves as a binary or analog quantity. In these figures, a touch point has contact area 610. Assume that the touch is fully blocking, so that any light that hits contact area 610 will be blocked. FIG. 6A shows what happens as the touch point moves left to right past a narrow beam. In the leftmost situation, the beam is not blocked at all (i.e., maximum Tjk) until the right edge of the contact area 610 interrupts the beam. At this point, the beam is fully blocked (i.e., minimum Tjk), as is also the case in the middle scenario. It continues as fully blocked until the entire contact area moves through the beam. Then, the beam is again fully unblocked, as shown in the righthand scenario. Curve 710 in FIG. 7 shows the transmittance Tjk as a function of the lateral position x of the contact area 610. The sharp transitions between minimum and maximum Tjk show the binary nature of this response.

FIG. 6B shows what happens as the touch point moves left to right past a wide beam. In the leftmost scenario, the beam is just starting to be blocked. The transmittance Tjk starts to fall off but is at some value between the minimum and maximum values. The transmittance Tjk continues to fall as the touch point blocks more of the beam, until the middle situation where the beam is fully blocked. Then the transmittance Tjk starts to increase again as the contact area exits the beam, as shown in the righthand situation. Curve 720 in FIG. 7 shows the transmittance Tjk as a function of the lateral position x of the contact area 610. The transition over a broad range of x shows the analog nature of this response.

E. Active Area Coverage

Figure 8A:
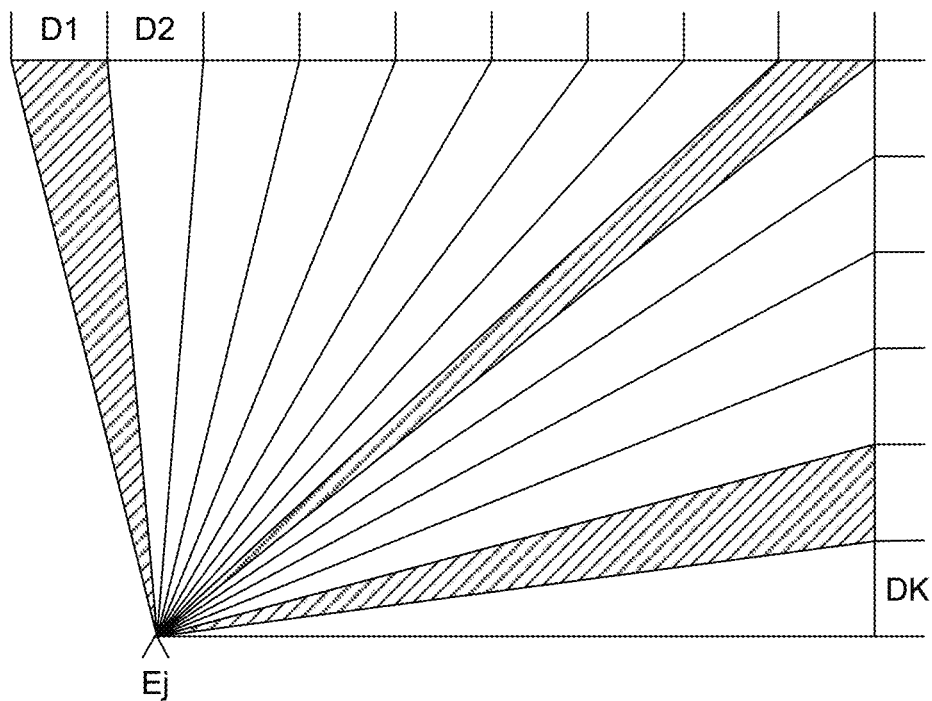
FIGS. 8A and 8B are top views illustrating active area coverage by emitters, according to some embodiments.
Figure 8B:
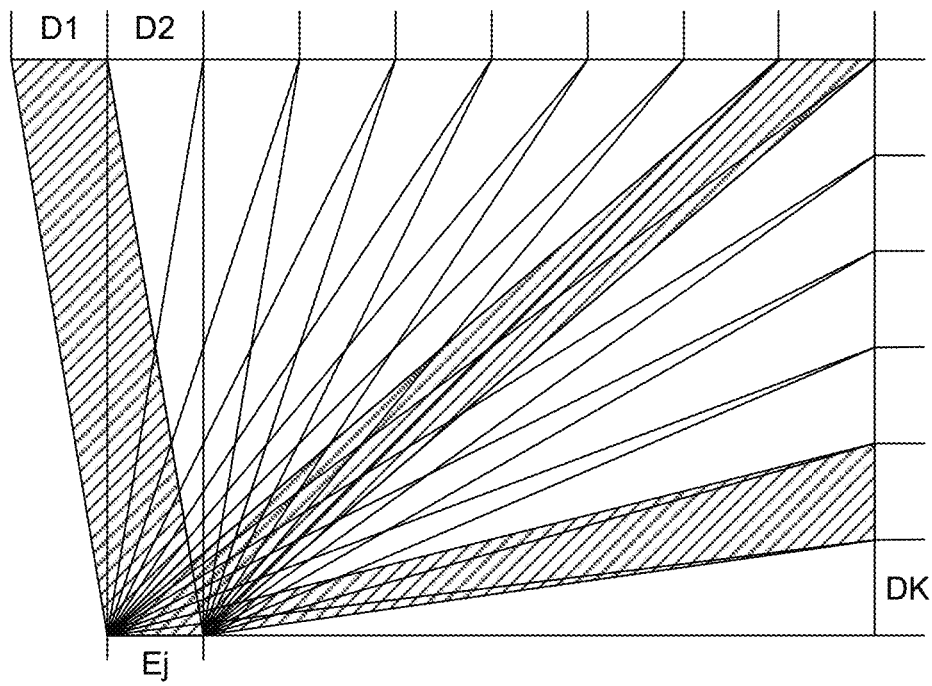

FIG. 8A is a top view illustrating the beam pattern produced by a point emitter. Emitter Ej transmits beams to wide detectors D1-DK. Three beams are shaded for clarity: beam j1, beam j(K−1) and an intermediate beam. Each beam has a fan-shaped footprint. The aggregate of all footprints is emitter Ej's coverage area. That is, any touch event that falls within emitter Ej's coverage area will disturb at least one of the beams from emitter Ej. FIG. 8B is a similar diagram, except that emitter Ej is a wide emitter and produces beams with "rectangular" footprints (actually, trapezoidal but we will refer to them as rectangular). The three shaded beams are for the same detectors as in FIG. 8A.

Note that every emitter Ej may not produce beams for every detector Dk. In FIG. 1, consider beam path aK which would go from emitter Ea to detector DK. First, the light produced by emitter Ea may not travel in this direction (i.e., the radiant angle of the emitter may not be wide enough) so there may be no physical beam at all, or the acceptance angle of the detector may not be wide enough so that the detector does not detect the incident light. Second, even if there was a beam and it was detectable, it may be ignored because the beam path is not located in a position to produce useful information. Hence, the transmission coefficients Tjk may not have values for all combinations of emitters Ej and detectors Dk.

The footprints of individual beams from an emitter and the coverage area of all beams from an emitter can be described using different quantities. Spatial extent (i.e., width), angular extent (i.e., radiant angle for emitters, acceptance angle for detectors), and footprint shape are quantities that can be used to describe individual beam paths as well as an individual emitter's coverage area.

An individual beam path from one emitter Ej to one detector Dk can be described by the emitter Ej's width, the detector Dk's width and/or the angles and shape defining the beam path between the two.

These individual beam paths can be aggregated over all detectors for one emitter Ej to produce the coverage area for emitter Ej. Emitter Ej's coverage area can be described by the emitter Ej's width, the aggregate width of the relevant detectors Dk and/or the angles and shape defining the aggregate of the beam paths from emitter Ej. Note that the individual footprints may overlap (see FIG. 8B close to the emitter). Therefore, an emitter's coverage area may not be equal to the sum of its footprints. The ratio of (the sum of an emitter's footprints)/(emitter's cover area) is one measure of the amount of overlap.

The coverage areas for individual emitters can be aggregated over all emitters to obtain the overall coverage for the system. In this case, the shape of the overall coverage area is not so interesting because it should cover the entirety of the active touch area 131. However, not all points within the active touch area 131 will be covered equally. Some points may be traversed by many beam paths while other points traversed by far fewer. The distribution of beam paths over the active touch area 131 may be characterized by calculating how many beam paths traverse different (x,y) points within the active area. The orientation of beam paths is another aspect of the distribution. An (x,y) point that is derived from three beam paths that are all running roughly in the same direction usually will be a weaker distribution than a point that is traversed by three beam paths that all run at 60 degree angles to each other.

Figure 8C:
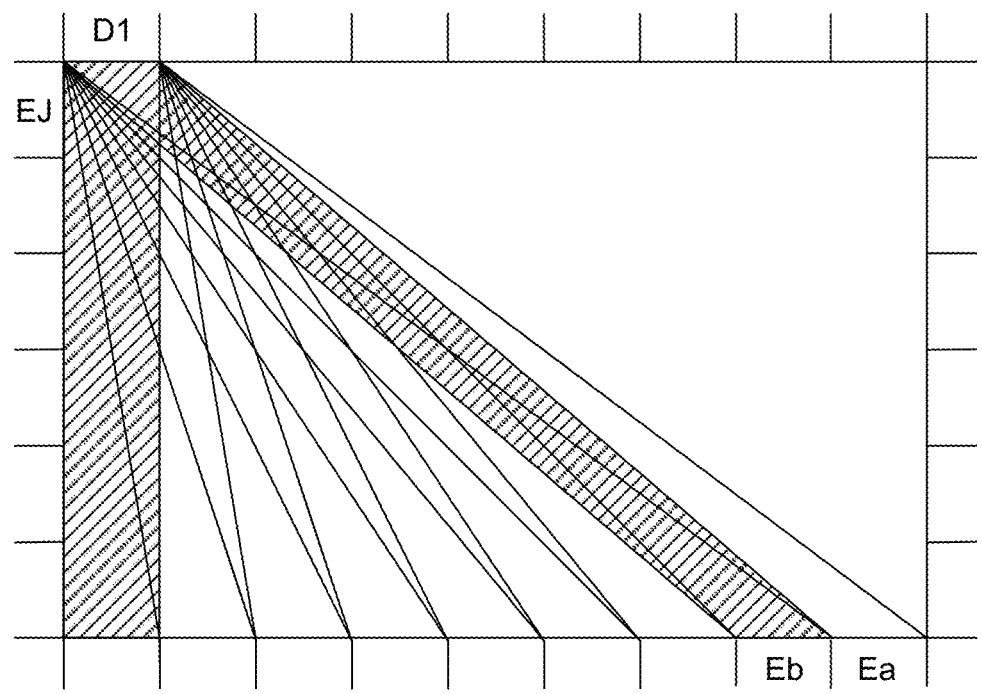
FIGS. 8C and 8D are top views illustrating active area coverage by detectors, according to some embodiments.
Figure 8D:
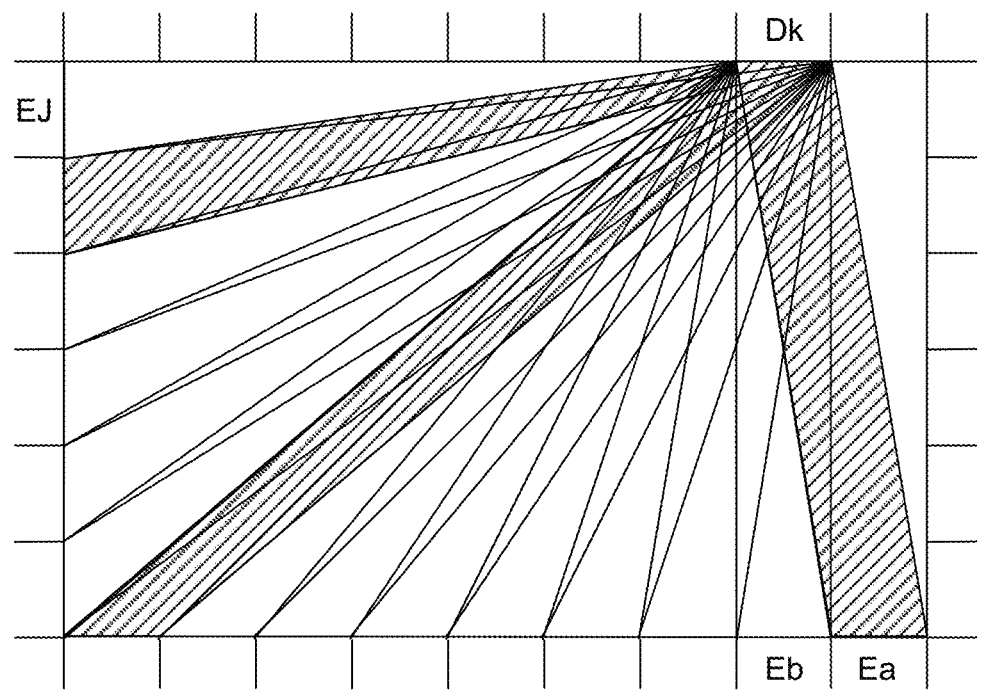

The discussion above for emitters also holds for detectors. The diagrams constructed for emitters in FIGS. 8A-8B can also be constructed for detectors. For example, FIG. 8C shows a similar diagram for detector D1 of FIG. 8B. That is, FIG. 8C shows all beam paths received by detector D1. Note that in this example, the beam paths to detector D1 are only from emitters along the bottom edge of the active area. The emitters on the left edge are not worth connecting to D1 and there are no emitters on the right edge (in this example design). FIG. 8D shows a diagram for detector Dk, which is an analogous position to emitter Ej in FIG. 8B.

A detector Dk's coverage area is then the aggregate of all footprints for beams received by a detector Dk. The aggregate of all detector coverage areas gives the overall system coverage.

The coverage of the active touch area 131 depends on the shapes of the beam paths, but also depends on the arrangement of emitters and detectors. In most applications, the active area is rectangular in shape, and the emitters and detectors are located along the four edges of the rectangle.

Figure 8E:
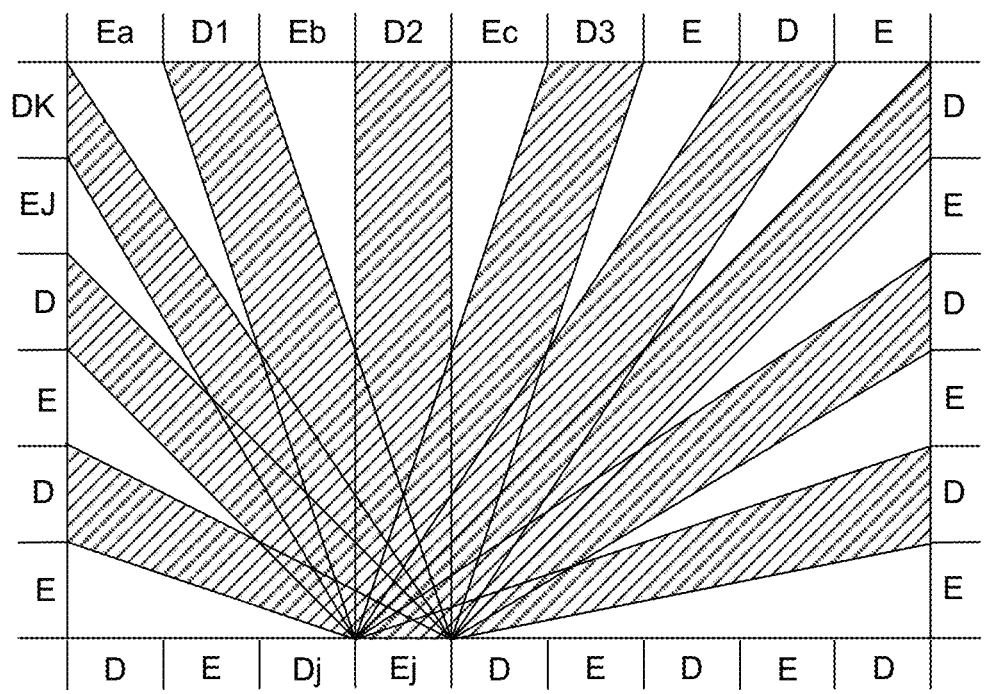
FIG. 8E is a top view illustrating alternating emitters and detectors, according to an embodiment.

In a preferred approach, rather than having only emitters along certain edges and only detectors along the other edges, emitters and detectors are interleaved along the edges. FIG. 8E shows an example of this where emitters and detectors are alternated along all four edges. The shaded beams show the coverage area for emitter Ej.

F. Multiplexing

Since multiple emitters transmit multiple optical beams to multiple detectors, and since the behavior of individual beams is generally desired, a multiplexing/demultiplexing scheme is used. For example, each detector typically outputs a single electrical signal indicative of the intensity of the incident light, regardless of whether that light is from one optical beam produced by one emitter or from many optical beams produced by many emitters. However, the transmittance Tjk is a characteristic of an individual optical beam jk.

Different types of multiplexing can be used. Depending upon the multiplexing scheme used, the transmission characteristics of beams, including their content and when they are transmitted, may vary. Consequently, the choice of multiplexing scheme may affect both the physical construction of the optical touch-sensitive device as well as its operation.

One approach is based on code division multiplexing. In this approach, the optical beams produced by each emitter are encoded using different codes. A detector receives an optical signal which is the combination of optical beams from different emitters, but the received beam can be separated into its components based on the codes. This is described in further detail in U.S. Pat. No. 8,227,742, entitled "Optical Control System With Modulated Emitters," which is incorporated by reference herein.

Another similar approach is frequency division multiplexing. In this approach, rather than modulated by different codes, the optical beams from different emitters are modulated by different frequencies. The frequencies are low enough that the different components in the detected optical beam can be recovered by electronic filtering or other electronic or software means.

Time division multiplexing can also be used. In this approach, different emitters transmit beams at different times. The optical beams and transmission coefficients Tjk are identified based on timing. If only time multiplexing is used, the controller cycles through the emitters quickly enough to meet a specified touch sampling rate.

Other multiplexing techniques commonly used with optical systems include wavelength division multiplexing, polarization multiplexing, spatial multiplexing and angle multiplexing. Electronic modulation schemes, such as PSK, QAM and OFDM, may also be possibly applied to distinguish different beams.

Several multiplexing techniques may be used together. For example, time division multiplexing and code division multiplexing could be combined. Rather than code division multiplexing 128 emitters or time division multiplexing 128 emitters, the emitters might be broken down into 8 groups of 16. The 8 groups are time division multiplexed so that only 16 emitters are operating at any one time, and those 16 emitters are code division multiplexed. This might be advantageous, for example, to minimize the number of emitters active at any given point in time to reduce the power requirements of the device.

III. Processing Phase

In the processing phase 220 of FIG. 2, the transmission coefficients Tjk are analyzed to determine the characteristics (e.g., location, contact area shape and size, disturbance pattern of the disturbed beams) of a touch event (this may be referred to as beam analysis). For location characterization, different approaches and techniques can be used, including candidate touch points, line imaging, location interpolation, touch event templates, multi-pass processing and beam weighting. These approaches are described in further detail in U.S. Pat. No. 8,350,831, "Method and Apparatus for Detecting a Multitouch Event in an Optical Touch-Sensitive Device," which is incorporated herein by reference. These approaches are also described in further detail in U.S. Pat. No. 9,092,092, "Detecting Multitouch Events in an Optical Touch-Sensitive Device Using Touch Event Templates," which is incorporated herein by reference. The transmission coefficients Tjk may also be used to identify the touch object (e.g., finger, stylus, or other instrument) of a touch event. Various methods are described in further detail in U.S. Pat. No. 9,791,976, "Instrument Detection with an Optical Touch Sensitive Device," which is incorporated herein by reference. Regardless of the approach used, information about a touch event (e.g., touch location, touch object type, touch pressure, etc.) can be determined from beam data (e.g., transmission coefficients Tjk).

IV. Sensor Fusion

The preceding sections describe various approaches for determining information about a touch event based on beam disturbances. The information available about touch events may be augmented by considering data from additional sensors. Furthermore, in some instances, data from additional sensors may be used to track objects that are in proximity to the touch surface but not in contact with it. This may provide various advantages, including "hover" interactions (e.g., where movement of a stylus over the surface without contacting it causes a different response than movement of the stylus while in contact with the surface) and improving the effectiveness of touch detection using beam data by providing predictions of the approximate location of future touch events.

In various embodiments, a touch device 100 may include one or more cameras to generate additional data from which information about touch objects and/or events can be inferred. For example, this may enable identification of touch objects before they contact the touch surface and/or tracking the position of the objects, even when the objects are not in contact with the surface=. Additionally, specialized touch objects designed to be identified and tracked may be used by the user. The following describes various examples of such cameras and specialized touch objects.

For convenience, touch objects are described as disturbing beams when they are in contact with the touch surface. Depending on the construction of a touch object, 'disturbing' may include blocking, absorbing, attenuating, amplifying, scattering, reflecting, refracting, diffracting, filtering, redirecting, etc. Furthermore, a touch object 'in contact with the touch surface' or 'on the touch surface' is defined to include a touch object physically contacting the surface and a touch object in close enough proximity to disturb beams. For example, a stylus interacting with a touch surface is in contact with the surface (even if it is not physically contacting the surface) if the stylus is disturbing beams propagating over the surface. A touch object that is 'above the surface' is defined as a touch object that is not in contact with the surface (i.e., the object is not disturbing beams) and in a volume extending away from the touch surface for which one or more additional sensors (e.g., cameras) generate data. For example, an object may be considered above the surface if it is not disturbing the optical beams propagating along the surface and within the field of view of one or more cameras of the device 100.

A. Cameras

Cameras may be positioned to capture images of touch objects to determine information about the touch objects. The cameras can be positioned to capture images of objects on the touch surface, above the touch surface, or both. The captured images may be analyzed to recognize and track touch objects. For example, image analysis can be used to track a touch object before, during, and after touch contact. The images can also be used to assist in touch detection, touch object type determination, and touch characteristic determination.

Figure 9A:
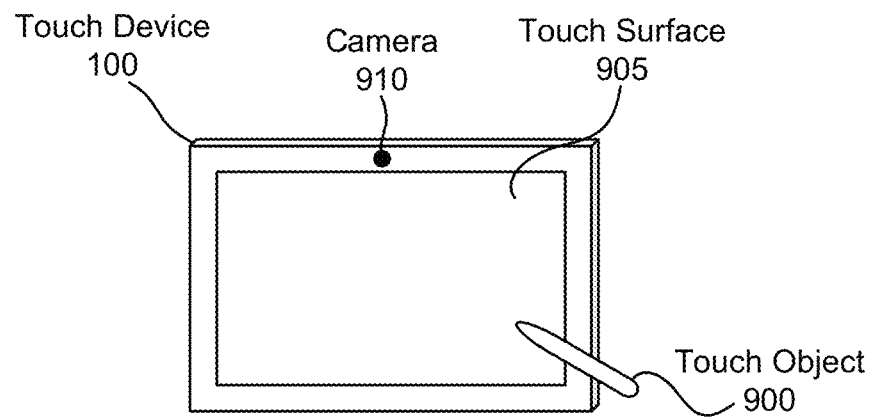
FIG. 9A illustrates a touch device with a camera along the periphery of the touch surface, according to an embodiment.
Figure 9B:
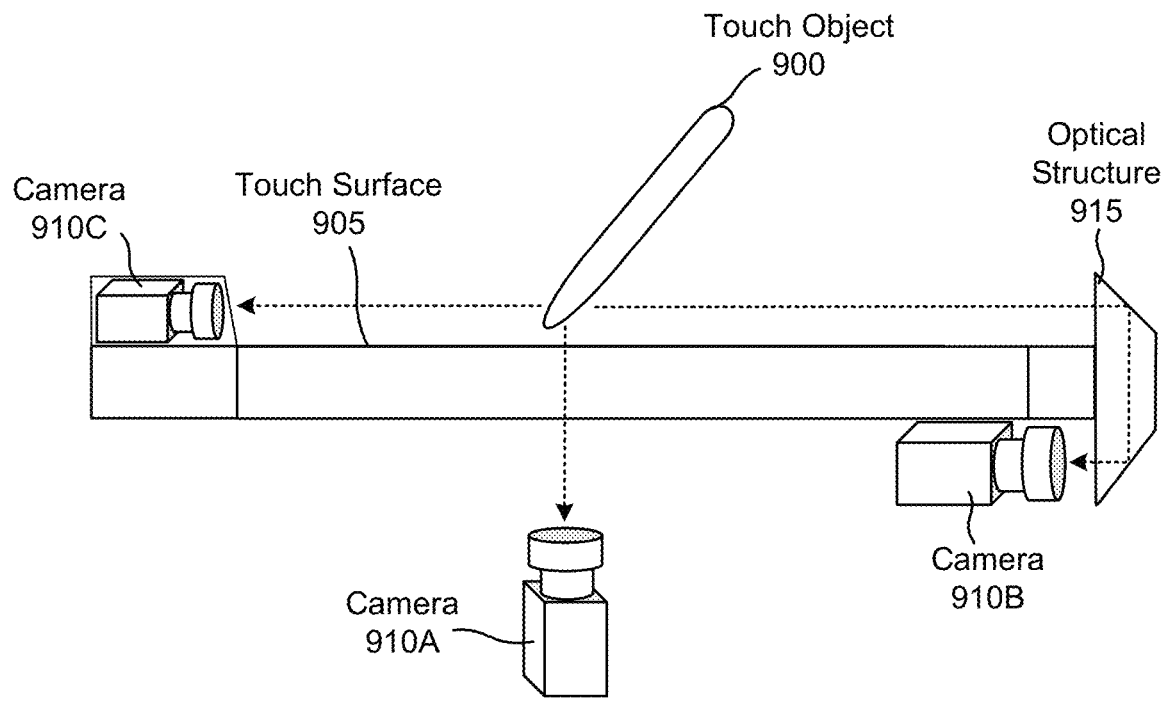
FIG. 9B illustrates various example camera positions around a touch surface 905.
Figure 13:
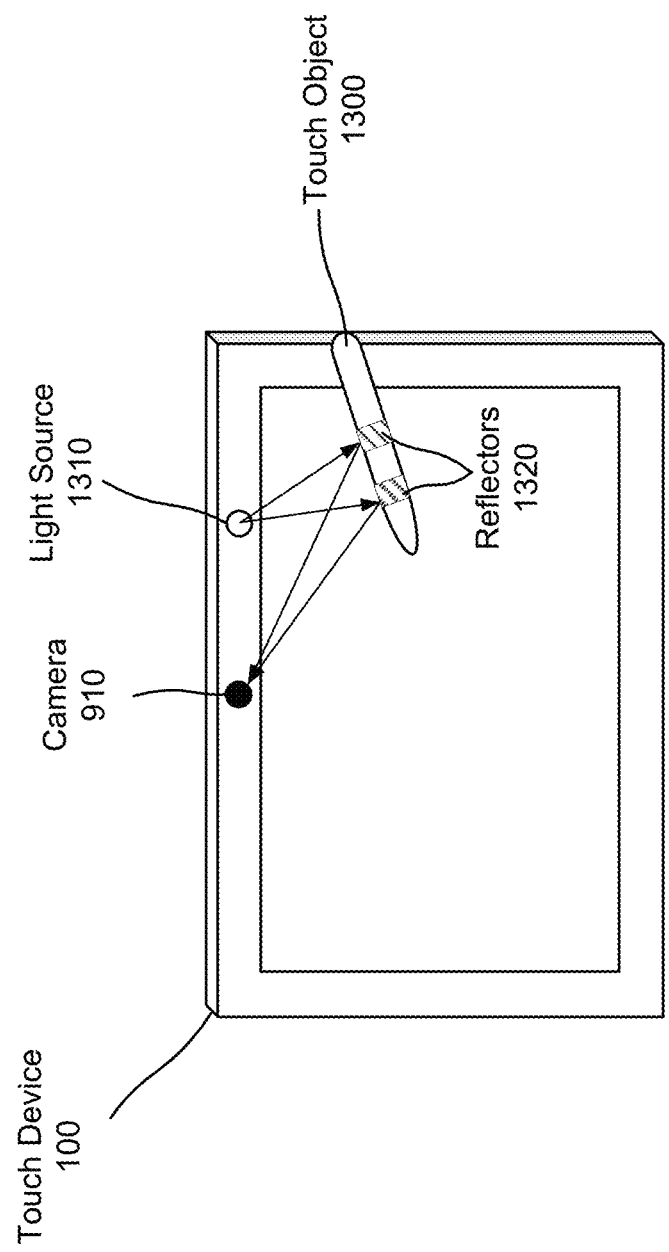
FIG. 13 illustrates a touch device with a camera and a light source, according to an embodiment.

FIG. 9A illustrates a touch device 100 with a camera 910 along the periphery of the touch surface 905, according to an embodiment. The camera 910 is distinct from the detectors, and the camera 910 is an image capturing device that includes a 2D array of sensor pixels and optical components (e.g., a lens) that direct light towards the array of sensor pixels. FIG. 9B illustrates various example camera positions around a touch surface 905. The camera 910 may be mounted to capture images of touch objects 900 in contact with the touch surface and/or touch objects above the touch surface. As illustrated in FIG. 9B, a camera 910 can be positioned above the surface (e.g., camera 910C) or below the touch surface 905 (e.g., cameras 910A and 910B). If the camera 910 is below the touch surface 905, the periphery of the surface may be bezel-free. If the touch surface 905 is transparent, the camera 910A behind the surface can record images through the touch surface. Camera 910B is located below the surface but captures images of a region above the surface using light that is directed below the surface by an optical structure 915. The optical structure 915 can include angled mirrors, reflectors, prisms, etc. The camera 910 may also be physically distinct from the device 100. For example, if the touch device 100 is mounted to a wall, a camera 910 can be mounted to an adjacent wall to capture images of touch objects 900 near or in contact with the touch surface 905. In some embodiments, the touch device 100 includes a light source to illuminate touch objects. Light sources can increase the visibility of touch objects and thus result in higher quality captured images. FIG. 13 illustrates a touch device 100 with a camera 910 and a light source 1310, according to an embodiment. Light from the light source 1310 is reflected from a touch object 1300 towards the camera 910. The light source 1310 is located along the periphery and the touch device 100 may include multiple light sources 1310. To increase the reflectivity of the touch object 1300, the touch object may include reflectors 1320 along its body.

To obtain 3D information, the camera 910 may be a time of flight (TOF) camera. A TOF camera determines the distance to an object by emitting pulses of light (e.g., not seen by a user). The distance between an object and the camera is based on the time taken for the pulses to reflect back to the camera and be recorded by an array of sensors. In some embodiments, the camera includes one or more masks positioned in front of the array of sensors. By measuring the mask shadows produced by light emitted by the object, or reflected off it (e.g., from light source 1310 in proximity to a camera but preferably not in the direct field-of-view of the camera), 3D position information of objects can be determined. An example light source radiating a diverging field of light will cast a wider shadow when close to a mask in front of a camera sensor array than when distant from it. Most commercially available LEDs are diverging sources of this kind, since they rarely have collimated lenses. The size of the shadow can be used to estimate the distance between the mask and the source or reflector 1320 if the light source is not on or in the object (e.g., light source 1310). The position of the shadow relative to the mask indicates the direction to the source. The camera 910 can also be a light imaging, detection, and ranging (LIDAR) system to track the position of touch objects.

Figure 10A:
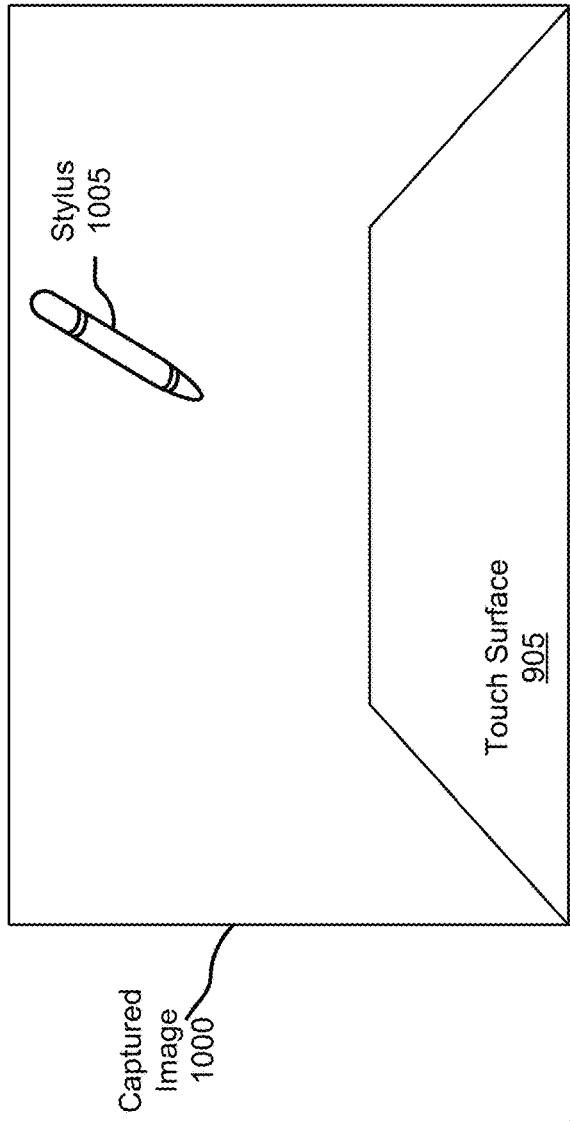
FIG. 10A illustrates an image captured by a camera, according to an embodiment.

If the field of view of the camera 910 includes the touch surface 905, touch objects 900 can be recognized and tracked even if the objects 900 are in contact with the surface 905. However, in this case the camera 910 may have limited visibility of touch objects 900 above the surface 905. An example image 1000 captured by a camera is illustrated in FIG. 10A. The image 1000 includes a stylus 1005 above the touch surface 905. If the field of view does not include the touch surface 905, then the camera 910 may have greater visibility of touch objects 900 above the surface 905. This allows touch objects 900 farther away from the touch surface 905 to be recognized and tracked. However, since the surface 905 is not in the captured images, recognition and tracking of objects 900 in contact with the surface 905 may be less accurate. To increase the field of view of the camera 910, the camera may have a wide-angle lens. Additionally or alternatively, the touch device 100 may include multiple cameras 910 that are spaced apart and orientated differently to cover various perspectives of the touch surface 905 and the space above the touch surface 905. During image analysis, the various perspectives may be combined (e.g., by triangulation) to improve touch object recognition and tracking. Multiple cameras 910 can also reduce losing a line of sight of a touch object 900 due to interference from other objects, such as hands, forearms, other users, etc.

Images from the camera (or cameras) can be analyzed (e.g., by the controller 110) to identify touch objects in the images. A touch object is any object that can disturb beams from the emitters. Typical touch objects include fingers, styli, palms, and forearms. For example, in image 1000, a single stylus 1005 is identified. If multiple touch objects are present in the images, each object may be identified. In some embodiments, only specific types of touch objects are identified (e.g., if there are too many potential touch objects present in an image). Touch objects may be identified by their shape and size. For example, if an object has a generally cylindrical shape with a length between 6 cm and 14 cm, the object can be classified as a stylus. In another example, an object which is substantially rectangular with a length greater than 10 cm in one axis and a length greater than 4 cm in any other axis can be classified as an eraser. Objects can also be identified by identification marks on the objects. For example, a fingernail indicates the object is a finger. In another example, a stylus includes reflective markings along the stylus body (e.g., see reflectors 1320 in FIG. 13). These markings may also be used to determine the orientation of the objects (described further below). Touch objects may be identified by object detection models (e.g., a machine learned model). Object recognition analysis may also include determining the object type of touch objects. For example, fingers, styli, palms, and forearms each have distinct shapes and sizes that make them distinguishable from one another. In some embodiments, if an object is not identified as a touch object, touches from the object are rejected. For example, if a user's shirt or sleeve is not identified as a touch object, touches from the shirt or sleeve may be recognized as unintentional touches and rejected.

Figure 10B:
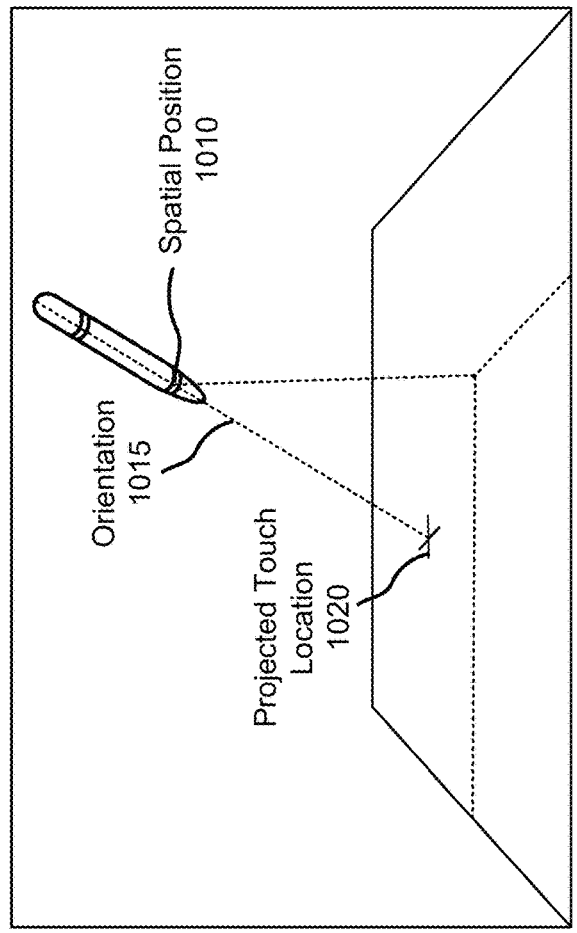
FIG. 10B illustrates the spatial position and orientation of a stylus in the image of FIG. 10A, according to an embodiment.

Determining information about touch objects can also include analyzing images to determine the spatial position of the objects relative to the touch surface (e.g., x, y, and z coordinates are determined). For example, FIG. 10B illustrates the spatial position 1010 and orientation 1015 of the stylus 1005 in the captured image 1000. The spatial position of each object may be tracked over time as each object move (e.g., in real-time). In some embodiments, only touch objects within a predetermined distance of the touch surface are tracked (e.g., if there are too many objects to track at once). The spatial positions of the objects may be determined by image object tracking algorithms. For example, template matching algorithms (different than the touch templates described in Section III) can be used to detect specific objects in an image. Block matching algorithms can be used to determine motion vectors associated with objects in the image, and combined with estimators, for example based on Kalman filters, to estimate the location of a tracked object in a given image frame. Where multiple objects are being tracked simultaneously, a consistent reference can be associated with each based on algorithms such as the Munkres assignment algorithm.

Determining the spatial position can also include determining the orientation and velocity of touch objects relative to the touch surface. For example, orientation angles (e.g., pitch, roll, and yaw) of a stylus may be determined. The velocity may be determined by calculating the change in spatial position over time (e.g., over different frames of the captured images). Image analysis may also determine whether a touch object is in contact with the surface. If so, the analysis may also determine the location of the object on the surface. A variety of coordinate systems for communicating the spatial position of touch objects relative to the touch surface may be used. For example, the coordinate system is centered on the touch surface. In another example, the coordinate system is with respect to a camera position or a field of view of the camera.

Among other advantages, determining information about a touch object (e.g., object recognition and position tracking) allows the touch device 100 to predict touch locations and touch object types before a touch event occurs (e.g., see the projected touch location 1020 in FIG. 10B). Since the position, orientation, and velocity of a touch object can be determined, if a touch object is projected to contact the surface, the location of the projected touch can be estimated. Thus, a region of the touch surface that is around or near the projected touch location can be identified. Beams with optical paths in the region are likely to be disturbed by the incoming touch object and thus can be monitored. For example, the beam distribution of the device may be adjusted to increase the number of beams in a region where a touch event is expected. The size of the region may depend on the uncertainty of the projected touch location. In some embodiments, the projected touch location is displayed to a user (e.g., by an 'X' mark). Displaying the projected touch location allows the user to visualize where the touch will be detected so he or she can move the touch object to a desired touch location.

In some embodiments, image analysis can determine an estimate of the force applied to the object towards the surface. If a stylus has a compliant tip, the applied force can be determined by measuring the amount of conformity of the tip on the surface in one or more images. This measure of force may be combined with analysis of beam data to provide a more accurate measure of force than that obtained from beam analysis or image analysis alone.

Using data from multiple sensors may also allow a user to interact with the touch device 100 without contacting the touch surface. The same motion perpendicular to the touch surface at different distances from the surface may yield different results. In other words, there may be two or more different interpretations of touch object motion based on the distance between the touch object and the touch surface (e.g., an 'in-contact' behavior, a 'close hover' behavior, and a 'far hover' behavior). For example, a user can perform an in-air swiping motion from left to right with a touch object to interact with a menu displayed on a screen whereas the same swiping motion performed while the stylus is touching the surface might draw a horizontal line.

In some embodiments, if a touch object approaches the touch surface, a screen can display an icon that indicates traits or attributes of the object before the object contacts the screen. For example, the icon can indicate ink color or object orientation. In some embodiments, if the touch object is above the surface (e.g., within 0.1 to 200 mm of the surface), a screen displays a menu. The location of the menu on the screen may follow the position of the touch object. The menu allows the user to select options and interaction modes via the touch object. For example, a user can select a function in the menu to copy a selected shape or annotation on the screen. In some embodiments, a user can scroll through the menu by changing one or more orientation angles of the touch object. A user may exit the menu by placing the touch object on the touch surface. For example, a user can highlight a tool on the menu by changing the orientation angle of the touch object and select the tool by contacting the touch surface. Among other advantages, this functionality can allow a user to rapidly and intuitively change menu tools by releasing the touch object from the surface, changing the stylus orientation angle, and contacting the surface again.

In some embodiments, if the spatial position of a touch object is tracked, a user can move objects on the screen by moving the touch object (even if the touch object is not on the surface). For example, moving the touch object parallel to the screen moves the object on the screen and moving the touch object perpendicular to the screen initiates a zooming function. In some embodiments, this function can only be performed when the touch object is greater than 200 mm away (e.g., in a 'far hover' region). In addition to interacting with a menu, the user can use a touch object to perform other functions such as launch a presentation, change a TV channel, change the volume, etc. In some embodiments, certain functions can only be performed in a prescribed distance range while in other embodiments any function can be performed at any distance from the touch surface.

To increase the accuracy, speed, and functionality of the touch device 100, the determined information (e.g., the results of image analysis and beam analysis) may be used in conjunction (e.g., combined). For example, deficiencies in the results of beam analysis can be corrected, or improved via image analysis, and vice versa. The results from one analysis technique can also confirm or replace the results of the other technique. By using image and beam analysis in conjunction, touch objects can be recognized and tracked continuously, even when the objects transition from above the surface to on the surface and vice versa. To use these techniques together, image analysis and beam analysis may be performed in series or in parallel.

Since beam analysis and image analysis can each recognize touch object types, beam analysis and image analysis may be used in conjunction to identify a touch object. For example, if an object type for a touch object is determined via image analysis, beam analysis may confirm the object type once the object contacts the surface. In embodiments, where beam analysis can determine the orientation or velocity of a touch object, image analysis can confirm or modify the results.

Typically, touch events and touch locations are determined via beam analysis. In these cases, image analysis can be used to confirm the determinations of the beam analysis. For example, if no touch events are detected via beam analysis, image analysis may confirm that no touch objects are on or near the surface. In some cases, image analysis determines a touch event and a touch location before beam analysis can. This may occur if image analysis is performed faster than beam analysis. This may also occur if beam analysis does not determine that a touch event occurred or the uncertainty of a touch event is high. For example, if a touch object lightly touches the surface, the touch may only be detected by image analysis.

By combining the results of beam and image analysis, identified touch events may be associated with touch objects. If a touch event is determined via beam analysis, a touch object tracked via image analysis can be associated with the event. For example, the touch object with a spatial position closest to the touch location is associated with the touch event. In another example, a touch object is associated with a touch event if the object type of the touch event matches an object type of a touch object. Associating a touch object with a touch events allows previously determined information about the object to be immediately associated with the touch event. For example, if a touch object was previously identified as an active stylus with a square tip (e.g., via image and/or beam analysis), then these characteristics may not need to be re-calculated if the object creates new touch events. Other examples of touch object information that can be associated with a touch event include the touch object type, object orientation, object size and shape, size and shape of a contact area, and the beam disturbance pattern created by the object. In some embodiments, user preferences are also associated with a touch object. For example, in a drawing application a user may assign touches from a stylus to perform erase functions and touches from a finger to perform a writing function. Thus, these functions may be associated with the touch objects and any touch events created by them. Additionally, any touch characteristics that are determined from a touch event (e.g., via beam analysis) can be associated with the touch object and stored for future touch events. Thus, by associating a known touch object with a touch event, the processing time for beam analysis can be decreased.

In embodiments where a camera field of view does not include the touch surface, object recognition and tracking can still be performed when objects are not in the field of view. Specifically, a touch object's spatial position can be tracked via image analysis when the object is in the field of view of the camera and the spatial position can be tracked via beam analysis when the object is in contact with the surface and out of the field of view of the camera. If the distance between the field of view and the surface is small (e.g., a few millimeters) image analysis and beam analysis may both be performed if a portion of the object is still present in the captured images when the object is in contact with the surface.

In some embodiments, unwanted touches may be recognized or confirmed by image analysis. In writing and drawing applications, touches by the user's palm and forearm are often unintentional touches. Methods for determining unintentional touches via beam analysis are described in detail in U.S. patent application Ser. No. 16/279,880, "Unwanted Touch Management in Touch-Sensitive Devices," which is incorporated herein by reference. Image analysis may be used in conjunction with beam analysis to increase the speed at which touches are classified as unintentional. For example, image analysis may confirm a user is writing and touches near the writing object are palm or forearm touches that can be ignored. Unwanted touches may also be recognized via image analysis before they occur. Using the previous example, if a user is writing with a stylus, image analysis may recognize and track the user's palm and forearms and classify them as unwanted touch objects before they contact the touch surface. Consequently, touch events from the unwanted touch objects can be ignored.

B. Styli

As further described below, styli may be configured to be recognized and tracked via image analysis. One advantage of styli compared to fingers is that a stylus can be designed to disturb beams in a specific manner. Thus, styli can be distinguished from each other and from other touch objects (e.g., fingers or palms) based on how beams are disturbed. For example, a finger will disturb beams incident at all angles approximately equally, whereas a stylus can be designed that attenuates beams in a one direction more strongly than beams in another direction. Thus, a stylus and a finger may be distinguished from each other based on the angular distribution of beam attenuation of a detected touch event.

Styli can also have increased functionality over other touch objects. For example, styli can have compliant tips and different operational modes (also referred to as stylus states). Example styli and styli functionalities are described in further detail in U.S. Pat. No. 9,965,101, "Instrument Detection with an Optical Touch Sensitive Device," U.S. patent application Ser. No. 16/254,420, "Compliant Stylus Interaction," and U.S. patent application Ser. No. 16/433,935, "Stylus with A Control" which are incorporated herein by reference.

Styli are generally configured to interact with a frustrated TIR touch surface (described with reference to FIG. 3A) or an OTS touch surface (described with reference to FIG. 3B). Styli for frustrated TIR touch surfaces generally disturb beams by virtue of the tip material having a refractive index higher than that of the surrounding air. This can cause beams to be coupled from the waveguide into the tip. Control styli for OTS touch surfaces generally include tips that are partially transmissive to beams (although wholly blocking tips may be used). This allows beams to pass through the tip, yet be disturbed (e.g., attenuated) enough to be detected by the detectors.

Figure 11:
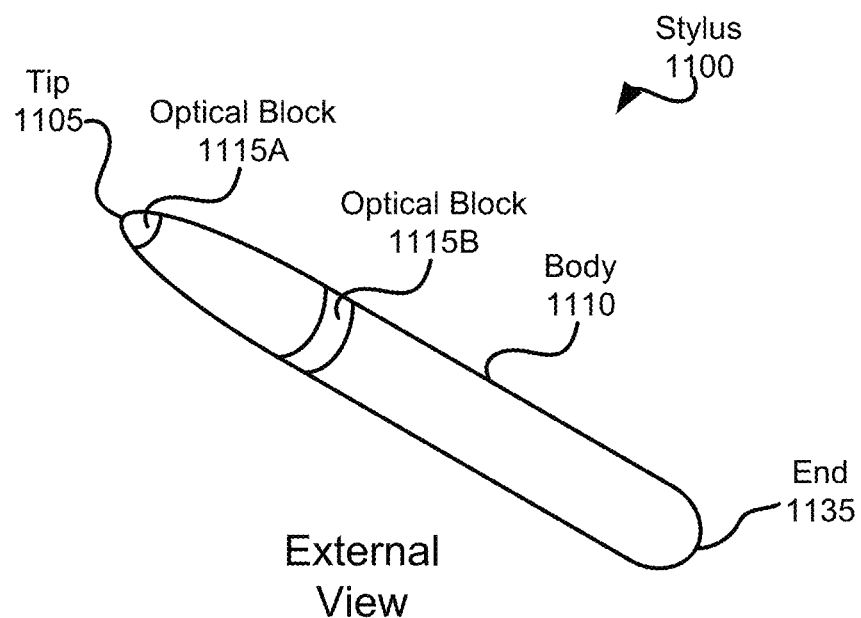
FIG. 11 illustrates views of an active stylus, according to an embodiment.
Figure 11:
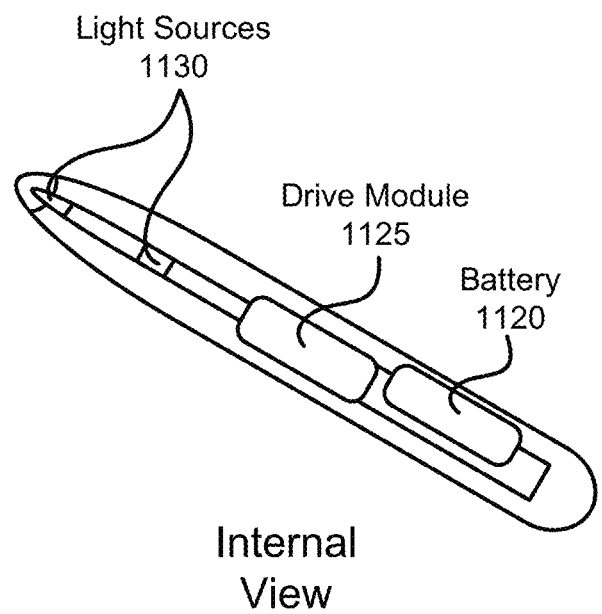

A stylus may be an active or a passive stylus. Passive styli interact with the optical beams transmitted between emitters and detectors but do not include electronic components or a power source. Active styli include a power source and electronic components that interact with the touch device 100. FIG. 11 illustrates views of an active stylus 1100, according to an embodiment. In the external view, the stylus 1100 includes a tip 1105, a body 1110, and optical blocks 1115. In the internal (cross-section) view, the stylus 1100 includes a battery 1120, a drive module 1125, and light sources 1130.

The optical blocks 1115 can emit light that can be detected by the touch device 100 (e.g., by cameras). The optical blocks 1115 may distribute light regularly in all directions (e.g., exhibiting near point source behavior) so as to make the stylus detectable from any position and orientation. The emitted light may include wavelengths in the visible or near infrared spectrum. The optical blocks 1115 include light sources 1130. The light sources 1130 may be a wide wavelength sources (e.g., LEDs) or a narrow wavelength sources (e.g., vertical-cavity surface-emitting lasers (VCSELs). The sources 1130 are driven by the drive module 1125 that is powered by the battery 1120. The optical blocks 1115 also include portions of the stylus tip 1105 or body 1110 that allow light from the sources 1130 to be emitted from the stylus 1100. The portions are translucent or transparent and aligned with the sources 1130. The portions may include any combination of diffusors, optical lenses, and diffractive optical elements (DOEs). While the stylus 1100 includes two optical blocks 1115, the stylus 1100 can include any number of optical blocks 1115.

In some embodiments, light emitted from the optical block 1115A is detected by the detectors. For example, if the surface is a frustrated TIR touch surface and the stylus 1100 is in contact with the surface, light from the optical block 1115A may be coupled into the waveguide. Thus, a touch event may be determined or confirmed by the detection of emitted light from an optical block 1115 by a detector.

The drive module 1125 can drive the blocks 1115 in a pulsed manner to save battery life and to provide a temporal pattern that can be detected by the touch device 100 via image analysis. The light pulses can be modulated by patterns unique to each stylus. In one embodiment, the pulse pattern includes a series of shorter pulses each with predefined amplitude (in the binary case, the amplitudes are 1 or 0, and define a serial binary code). In another embodiment, the modulation pattern is the duration of the pulse. Other baseband signaling schemes can also be used. The pulse pattern can be used to identify the stylus 1100 before it contacts the touch surface. The pulse pattern can also be used to distinguish between multiple styli. For example, different styli are assigned different roles or functions. If a stylus includes multiple operating modes, the pulse pattern can indicate the mode of the stylus. For example, in a writing application, a first pulse pattern indicates the stylus 1100 should be processed as a writing tool and a second pulse pattern indicates the stylus 1100 should be processed as an eraser tool. In some embodiments, the stylus 1100 can simultaneously communicate with multiple touch devices 100. For example, if a user selects an ink color by interacting with a touch device 100, other touch devices 100 can determine the selected ink color by detecting the pulse patterns. This allows the user to write on each touch device 100 without needing to select an ink color for each device 100. Additionally or alternatively, the optical blocks 1115 are detectable based on the spacing and shape of the blocks, distribution of emitted light, polarization of the emitted light, and wavelengths of the emitted light. For example, the optical blocks 1115 emit different colors in different directions.

If light from both optical blocks 1115 is detected, the relative position of light from the blocks provides insight into the orientation of the stylus 1100. In some embodiments, each block 1115 is distinguishable from the other. For example, each optical block 1115 emits different wavelengths (e.g., colors) of light and/or different pulse patterns. The spatial position of each pulse made be determined via image analysis. Thus, the stylus orientation can be the orientation that best matches the calculated positions of the optical blocks 1115. While the stylus 1100 includes an optical block 1115A on the tip 1105 and an optical block 1115B on the body 1110, optical blocks 1115 may be in different positions e.g., both are along the body 1110. Determination of the orientation of the stylus 1100 may provide additional stylus functionality. For example, if the stylus 1100 is in contact with the surface, a writing application can provide calligraphy effects that depend on the orientation of the stylus 1100 with respect to the surface. In another example, in a drawing application, the tip 1105 can be used to write, the end 1135 can be used to erase, and the body 1110 can be used as a wide eraser.

The stylus 1100 can include components not illustrated in FIG. 11. For example, the stylus 1100 contains a communications channel to provide information to the touch device 100 (e.g., the stylus 1100 includes Bluetooth, ZigBee, or another type of radio frequency (RF) transceiver). In another example, the stylus 1100 includes sensors, such as pressure sensors, gyroscopes, accelerometers, and beam detectors (e.g., that detect beams disturbed by the stylus 1100). Sensor information may be wirelessly sent to the touch device 100 via the communications channel. This information can be used in conjunction with image analysis and beam analysis to increase the accuracy and speed of the touch device 100.

To save battery life when the stylus 1100 is not in use, the stylus 1100 may include an activity sensor. For example, a lack of stylus activity for a time period results in the activity sensor transitioning the stylus to a low-power mode. The stylus activity may be determined from an accelerometer that indicates changes in orientation of the stylus body 1110.

In another example, the stylus activity is determined from a pressure sensor in the tip 1105. The optical blocks 1115 may emit light or no light to indicate that the stylus 1100 is in the low-power mode. If the stylus activity changes or increases, the activity sensor may transition the stylus to a normal mode which may be indicated by the optical blocks 1115.

Touch objects other than styli can be designed to be tracked. For example, a ruler can be used with the stylus for drawing applications. The ruler may integrate all relevant features of the stylus 1100 described above while being distinguished from the stylus 1100. For example, the rule includes optical blocks that emit pulses at a distinct frequency. Other interaction objects can be envisaged such as weapons and shields objects or catching objects used for an entertainment experience.

C. Multiple Touch Devices

Figure 12:
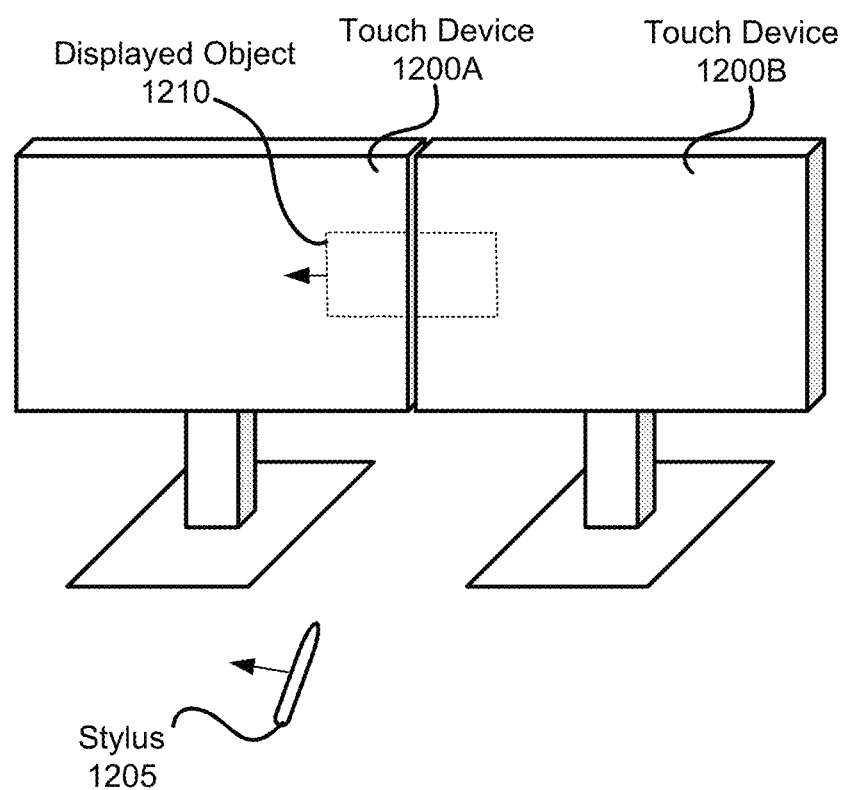
FIG. 12 illustrates two touch devices coupled together, according to an embodiment.

In some embodiments, multiple touch devices are communicatively coupled together. FIG. 12 illustrates two touch devices 1200 coupled together, according to an embodiment. This allows touch objects to be recognized and tracked by multiple touch devices 1200. Each device 1200 may separately recognize and track touch objects. Alternatively, the devices 1200 are coupled to function as a single unit such that image and beam analysis information is shared across the devices. This allows recognition and tracking continuity to be maintained across separate devices 1200. The separate devices 1200 may be physically coupled together e.g., by sharing a controller 110 and/or touch event processor 140. Alternatively, as seen in FIG. 12, the coupled devices 1200 can be physically distinct and communicate via a wired or wireless communication channel. In some embodiments, the devices 1200 communicate via the cloud. By coupling devices together, touch objects can simultaneously interact with multiple devices. For example, as seen in FIG. 12, by moving stylus 1205, a displayed object 1210 can be moved from device 1200B to device 1200A. The stylus 1205 (or any other touch object) may be mutually identified and tracked by the devices 1200 based on unique characteristics of the stylus 1205, such as the pattern of light emitted from the stylus, the size and shape of optical blocks on the stylus, or wavelengths of light emitted from the stylus.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation, and details of the method and apparatus disclosed herein.

What is claimed is:

1. A system comprising:
    a touch surface and emitters and detectors, the emitters producing optical beams that propagate across the touch surface and are received by the detectors, wherein touches from a touch object in contact with the touch surface disturb the optical beams;
    a camera positioned to capture images of at least one of: the touch object in contact with the touch surface or above the touch surface, wherein the touch object is a stylus and the captured images include light emitted by the stylus; and
    a controller configured to:
        receive beam data from the detectors for optical beams distributed by the touch object;
        receive the captured images of the touch object from the camera; and
        determine information about the touch object based on the beam data and the captured images, wherein the controller being configured to determine information about the touch object includes the controller being configured to:
            determine the touch object is a stylus based on the light emitted by the stylus; and
            determine a touch location of the stylus on the touch surface based on the beam data.

2. The system of claim 1, wherein to determine the information about the touch object, the controller is further configured to determine a spatial position of the touch object relative to the touch surface.

3. The system of claim 2, wherein to determine the spatial position of the touch object, the controller is further configured to determine the touch object is in contact with the touch surface based on the beam data and the captured images.

4. The system of claim 2, wherein to determine the spatial position of the touch object, the controller is further configured to:
    determine the touch object is in contact with the touch surface based on at least one of the beam data or the captured images; and
    determine an approximate touch location of the touch object on the touch surface based on the captured images, wherein
    to determine the touch location, the controller is configured to modify the approximate touch location based on the beam data.

5. The system of claim 2, wherein to determine the spatial position of the touch object, the controller is further configured to:
    determine the touch object is in contact with the touch surface based on the beam data; and
    determine an orientation of the touch object based on the captured images.

6. The system of claim 2, wherein to determine the spatial position of the touch object, the controller is further configured to:
    determine the touch object is above the touch surface based on the beam data and the captured images; and
    determine the spatial position of the touch object above the touch surface based on the captured images.

7. The system of claim 6, wherein to determine the spatial position of the touch object, the controller is further configured to:
    determine an orientation of the touch object based on the captured images.

8. The system of claim 2, wherein to determine the spatial position of the touch object, the controller is further configured to:
    determine a projected touch location on the touch surface before the touch object contacts the touch surface based on the captured images.

9. The system of claim 8, wherein to determine the touch location, the controller is further configured to:
    monitor beam data associated with beam paths in a region of the touch surface that includes the projected touch location.

10. The system of claim 2, wherein the controller is further configured to track the spatial position of the touch object as the touch object moves.

11. The system of claim 10, wherein the spatial position of the touch object is tracked in real-time.

12. The system of claim 1, wherein to determine the information about the touch object, the controller is further configured to determine a touch object type of the touch object based on the beam data or the captured images.

13. The system of claim 1, wherein to determine the information about the touch object, the controller is further configured to:
determine an operational mode of the touch object based on the captured images and the beam data.

14. The system of claim 1, wherein the controller being configured to determine information about the touch object further includes the controller being configured to track a spatial position of the stylus based on the light emitted by the stylus.

15. A system comprising:
a touch surface and emitters and detectors, the emitters producing optical beams that propagate across the touch surface and are received by the detectors, wherein touches from a touch object in contact with the touch surface disturb the optical beams;
a camera positioned to capture images of at least one of: the touch object in contact with the touch surface or above the touch surface, wherein the touch object is a stylus and the captured images include light emitted by the stylus; and
a controller configured to:
receive beam data from the detectors for optical beams distributed by the touch object;
receive the captured images of the touch object from the camera; and
determine information about the touch object based on the beam data and the captured images, wherein the controller being configured to determine information about the touch object includes the controller being configured to:
determine a touch location of the stylus on the touch surface based on the beam data; and
determine an orientation of the stylus based on the light emitted by the stylus.

16. A system comprising:
a touch surface and emitters and detectors, the emitters producing optical beams that propagate across the touch surface and are received by the detectors, wherein touches from a touch object in contact with the touch surface disturb the optical beams;
a camera positioned to capture images of at least one of: the touch object in contact with the touch surface or above the touch surface, wherein the touch object is a stylus and the captured images include light emitted by the stylus; and
a controller configured to:
receive beam data from the detectors for optical beams distributed by the touch object;
receive the captured images of the touch object from the camera; and
determine information about the touch object based on the beam data and the captured images, wherein the controller being configured to determine information about the touch object includes the controller being configured to:
determine a touch location of the stylus on the touch surface based on the beam data; and
distinguish the stylus from another touch object based on the light emitted by the stylus.

17. The system of claim 1, wherein the camera is positioned on a periphery of the touch surface.

18. The system of claim 1, wherein the camera is positioned below the touch surface.

19. The system of claim 1, wherein the camera is a time of flight (TOF) camera.

20. The system of claim 15, wherein the controller being configured to determine information about the touch object further includes the controller being configured to track a spatial position of the stylus based on the light emitted by the stylus.

* * * * *